(12) United States Patent
Cotterill

(10) Patent No.: US 8,769,624 B2
(45) Date of Patent: Jul. 1, 2014

(54) ACCESS CONTROL UTILIZING INDIRECT AUTHENTICATION

(75) Inventor: Stephen Hayden Cotterill, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 13/248,882

(22) Filed: Sep. 29, 2011

(65) Prior Publication Data

US 2013/0086637 A1 Apr. 4, 2013

(51) Int. Cl.
*H04L 29/06* (2006.01)
(52) U.S. Cl.
CPC .................................. *H04L 63/0853* (2013.01)
USPC ............... 726/4; 713/183; 455/41.1; 711/163
(58) Field of Classification Search
CPC ....... G06F 21/32; G06F 21/121; G06F 21/31; G06F 21/62; G06F 2221/2149; H04L 63/0853
USPC .............................................................. 726/4
See application file for complete search history.

(56) References Cited

U.S. PATENT DOCUMENTS

| 7,415,720 | B2 * | 8/2008 | Jung .................................. 726/2 |
| 7,877,455 | B2 | 1/2011 | Lamparello et al. |
| 8,042,157 | B2 * | 10/2011 | Bennett et al. ...................... 726/4 |
| 2002/0059295 | A1 * | 5/2002 | Ludtke et al. ............... 707/104.1 |
| 2002/0169673 | A1 | 11/2002 | Prorock et al. |
| 2002/0170782 | A1 | 11/2002 | Millikan |
| 2004/0181695 | A1 * | 9/2004 | Walker .......................... 713/202 |
| 2007/0186106 | A1 | 8/2007 | Ting et al. |
| 2008/0114678 | A1 | 5/2008 | Bennett et al. |
| 2008/0229409 | A1 * | 9/2008 | Miller et al. ..................... 726/19 |
| 2009/0054044 | A1 | 2/2009 | Ikemori et al. |
| 2009/0094681 | A1 * | 4/2009 | Sadler et al. ....................... 726/4 |
| 2009/0119754 | A1 * | 5/2009 | Schubert .......................... 726/4 |
| 2009/0122149 | A1 * | 5/2009 | Ishii ........................... 348/222.1 |
| 2009/0193514 | A1 * | 7/2009 | Adams et al. .................... 726/17 |
| 2009/0241169 | A1 * | 9/2009 | Dhand et al. ....................... 726/3 |
| 2011/0054268 | A1 * | 3/2011 | Fidacaro et al. .............. 600/300 |
| 2011/0138166 | A1 * | 6/2011 | Peszek et al. ..................... 713/2 |
| 2011/0142234 | A1 | 6/2011 | Rogers |
| 2011/0149874 | A1 * | 6/2011 | Reif .............................. 370/329 |

OTHER PUBLICATIONS

PCT International Search Report and Written Opinion of the International Searching Authority for International Application No. PCT/US2012/057656, mailed Feb. 25, 2013, (9 pages).

* cited by examiner

*Primary Examiner* — Hadi Armouche
*Assistant Examiner* — Bryan Wright
(74) *Attorney, Agent, or Firm* — Blakely, Sokoloff, Taylor & Zafman LLP

(57) ABSTRACT

Techniques are provided for granting authorization to restricted content on a display device from an authorizing device. In one embodiment, the display device may operate in a display mode where only unrestricted content is accessible. To access restricted content, the display device may transmit an authorization request signal to the authorizing device. The authorizing device, having received the authorization request, prompts an authorized user to enter an authentication input, such as a password or gesture, on the authorizing device. Upon verification of the authentication input, the authorizing device is authenticated. An authorization signal is transmitted to the display device, and the display device may operate in an authorized mode, having access to otherwise restricted content or functions.

26 Claims, 12 Drawing Sheets

ACCESS CONTROL UTILIZING INDIRECT AUTHENTICATION

BACKGROUND

The present disclosure relates generally to electronic devices, and more specifically to controlling access to content on an electronic display device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic display devices such as cellular telephones, computers, tablets, and so forth, are increasingly used for a variety of display applications. For example, electronic display devices are commonly utilized to display information in public settings, such as in retail or exhibition venues. Integrating such electronic display devices in such retail or exhibition venues may be valuable for a number of reasons. For instance, electronic display devices may be interactive with potential customers, such that potential customers may use a display device to view different information on the display screen, resize the information displayed on the screen, request employee assistance by using graphical user interfaces on the screen, etc. Moreover, if the electronic display device itself is a product of the business or retail establishment, using the device as an informative display may allow potential customers to sample the functionality of the device. Using electronic display devices as an informative display may therefore be an integral retail or marketing strategy for many businesses. Due to the accessibility of such informative displays, the displays may typically be configured to have content and function restrictions for security, proprietary, and/or confidentiality reasons. For example, while informative displays may display limited content (e.g., pricing information, product specifications, product reviews, etc.) to potential customers, such devices may also include other information (e.g., inventory and sales data, customer information, warrantee information, etc.) which may be accessible only to employees and/or managers. In certain situations, an employee may wish to access the restricted information in the presence of a customer. However, in such situations, utilizing a conventional password login interface method may not be sufficiently secure, as the password may be seen and made repeatable by unauthorized bystanders. Additionally, deliberately shielding a screen from view of bystanders may be an undesirable retail strategy. Therefore, a means for accessing restricted content on an electronic display device without compromising the future security of the restricted content may be desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for obtaining indirect device authorization. For example, a display device may have a display mode and an authorized mode, wherein the display mode is accessible by default and the authorized mode is only accessible after the display device has been authorized by a separate authorizing device. The present techniques allow the display device to send an authorization request to the authorizing device, and allow the authorizing device to give or deny authorization to the first device by sending an authorization signal.

In some embodiments, the display device may be used in a retail environment as electronic signage when in the display mode, and the authorizing device may be a device used by an employee. In this embodiment, the display device may need to enter the authorized mode so that its content may be changed or so that the employee may access other functions on the display device. Thus, the display device may enter the authorized mode so long as the employee configures the second device gives authorization to the display device Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques involve wirelessly providing authorization to a first device, also referred to as a display device, by a second device, also referred to as an authorizing device. Specifically, the display device may have unrestricted content that is accessible to any user of the device, as well as restricted content that is generally not accessible to a user without receiving authorization from the second device. The display device may operate in a display mode when only the unrestricted content is accessible and in an authorized mode when authorization is received and a portion or all of the restricted content becomes accessible.

One application of such techniques is in a retail environment where electronic display devices may be accessible to customers in display mode. Generally, such display devices may be configured to have certain unrestricted content and functions accessible to customers. For example, such unrestricted content may be related to content for advertising and/or demonstrating the product. However display devices may also operate in an authorized mode, where the display device 62 may access certain or any restricted content that may not be accessible in display mode.

For example, in a retail setting, an employee may intent to demonstrate a certain feature on the display device or access certain information that is generally restricted on the display device. Authorization may be required to operate the display device in an authorized mode, such that the employee may access the features or content from the display device which may generally be restricted in display mode. As providing authorization on the display device may be inconvenient or inefficient, the employee may use a second device, also referred to as an authorizing device, to grant authorization to operate the display device in an authorized mode.

Figure 1:
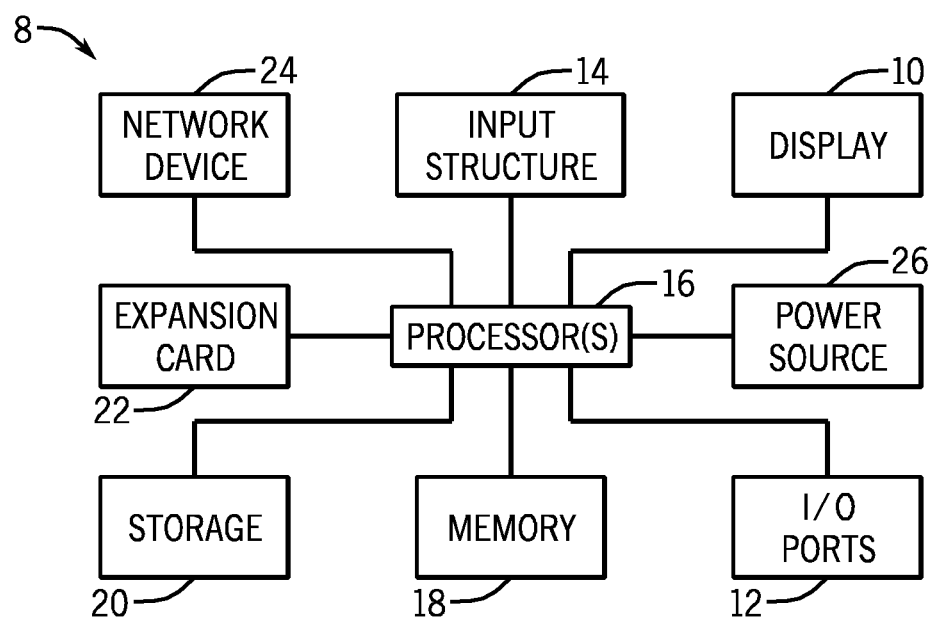
FIG. 1 is a block diagram of an electronic device, in accordance with aspects of the present disclosure.
Figure 2:
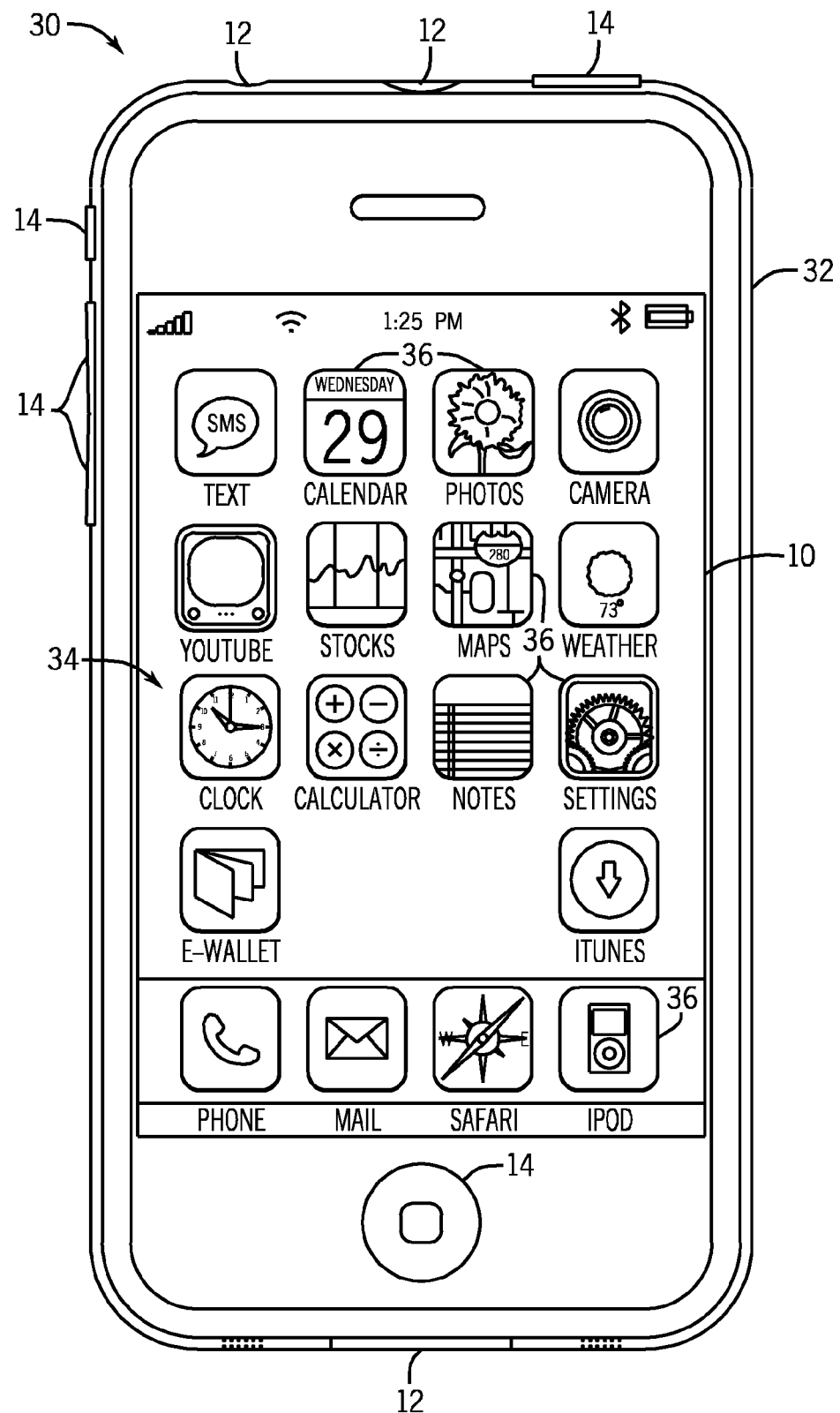
FIG. 2 is a perspective view of a handheld electronic device in accordance with aspects of the present disclosure.
Figure 3:
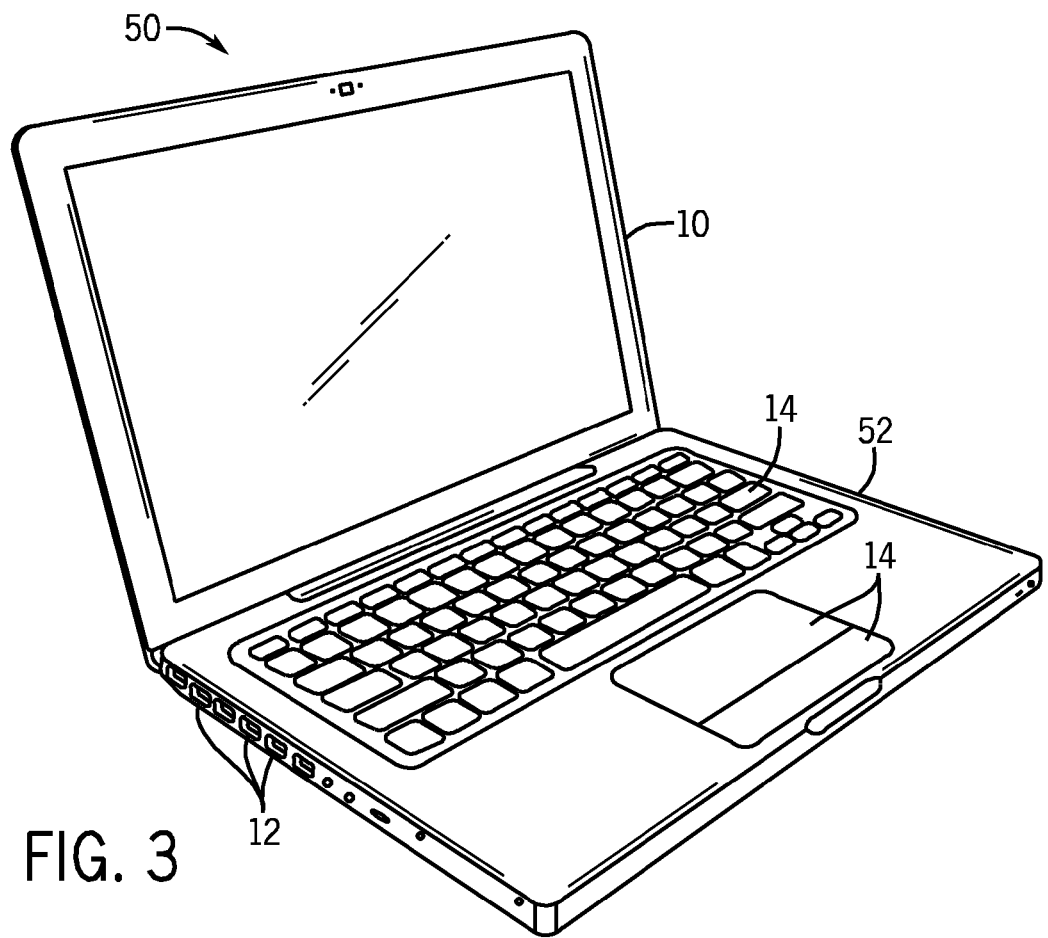
FIG. 3 is a perspective view of a computer for use in accordance with aspects of the present disclosure.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing suitable storage and/or processing capabilities, may be used in conjunction with the present techniques. For example, these and similar types of electronic devices may have wireless communication capabilities and may implement non-alphanumeric, non-biometric authentication schemes to access restricted content or functions in accordance with the teachings of the present disclosure.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein.

As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, data processing circuitry, such as one or more processors 16, a memory device 18, a non-volatile storage 20, expansion card(s) 22, a networking device 24, and a power source 26.

With regard to each of these components, the display 10 may be used to display various images generated by the device 8. The display 10 may be any type of display such as a cathode ray tube (CRT), a liquid crystal display (LCD), a light emitting diode (LED) display, an organic light emitting diode (OLED) display, or other suitable display. In certain embodiments of the electronic device 8, the display 10 may include a touch-sensitive element, such as a touch screen.

The I/O ports 12 may include ports configured to connect to a variety of external devices, such as a power source or other electronic devices (such as handheld devices and/or computers, printers, projectors, external displays, modems, docking stations, and so forth). The I/O ports 12 may support any standard or proprietary interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which input or feedback is provided to data processing circuitry, such as the processor 16. Such input structures 14 may be configured to control a function of the device 8 when actuated. For example, the input structures 14 may include buttons, sliders, switches, control pads, keys, knobs, scroll wheels, keyboards, mice, touchpads, and so forth. In certain embodiments, the input structures 14 may also include such components as global positioning system (GPS) circuitry and/or accelerometers that convey information about the location and/or orientation of the device 8 to the processors 16.

In certain embodiments, an input structure 14 and display 10 may be provided together, such an in the case of a touch screen where a touch sensitive mechanism is provided in conjunction with the display 10. In such embodiments, the user may select or interact with displayed interface elements via the touch sensitive mechanism. In this way, the displayed user interface may provide interactive functionality, allowing a user to select, by touch screen or other input structure, from among options displayed on the display 10.

User interaction with the input structures 14, such as to interact with a user or application interface displayed on the display 10, may generate electrical signals indicative of the user input. These input signals may be routed via suitable pathways, such as an input hub or bus, to data processing circuitry, such as the processor(s) 16, for further processing.

The processor(s) 16 may provide data processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a memory 18. The memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware executed by a processor 16 (such as basic input/output instructions or operating system instructions, including instructions implementing non-alphanumeric authentication (e.g., authentication not based on keys or characters found on a keyboard) as discussed herein), other programs that enable various functions of the electronic device 8, user interface functions, processor functions. In addition, the memory 18 may be used for buffering or caching during operation of the electronic device 8.

The components may further include a non-volatile storage 20 for persistent storage of data and/or instructions. The non-volatile storage 20 may include flash memory, a hard drive, or any other optical, magnetic, and/or solid-state storage media. The non-volatile storage 20 may be used to store data files such as personal or business information (e.g., financial and other account information), software, wireless connection information (e.g., information that may enable the electronic device 8 to establish a wireless connection, such as a telephone or wireless network connection), and any other suitable data. In addition, the non-volatile storage 20 may also store code and/or data for implementing various functions of the electronic device 8, such as application or program code, data associated with such applications or programs, operating system code, user configured preferences, as well as code for implementing secure user authentication as discussed herein.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable standard or proprietary connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), cellular network, or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone, which may be used as a display device and/or an authorizing device. It should be noted that while the depicted handheld device 30 is provided in the context of a cellular telephone, other types of handheld devices (such as media players for playing music and/or video, personal data organizers, handheld game platforms, and/or combinations of such devices) may also be suitable be provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the generalized electronic device of FIG. 1, the handheld device 30 may allow a user to connect to and communicate through the Internet or through other networks, such as local or wide area networks or cellular networks. For example, the handheld device 30 may allow a user to communicate using e-mail, text messaging, instant messaging, or other forms of electronic communication. The handheld electronic device 30, may also communicate with other devices using short-range connections, such as Bluetooth and near field communication. By way of example, the handheld device 30 may be a model of an iPod® or iPhone®, or a derivative thereof, available from Apple Inc. of Cupertino, Calif.

In the depicted embodiment, a housing 32 includes input structures 14 through which a user may interface with the device. Each input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

A display 10 of the handheld device 30 may be used to display a graphical user interface (GUI) 34 that allows a user to interact with the handheld device 30. The GUI 34 may include various layers, windows, screens, templates, or other graphical elements that may be displayed in all, or a portion, of the display 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 10 in certain embodiments, or may be selected by a user input structure 14, such as a wheel or button.

In addition to handheld devices 30, such as the depicted cellular telephone of FIG. 2, an electronic device 8 may also take the form of a computer or other types of electronic device on which confidential information might be stored and on which software code governing secure access to such information might be executed. Such computers may include computers that are generally portable (such as laptop, notebook, and tablet computers) as well as computers that are generally used in one place (such as conventional desktop computers, workstations and/or servers). In certain embodiments, the electronic device 8 in the form of computer may be a model of a MacBook®, MacBook® Pro, MacBook Air®, iMac®, Mac® mini, or Mac Pro® available from Apple Inc.

By way of example, an electronic device 8 in the form of a laptop computer 50 is illustrated in FIG. 3 in accordance with one embodiment. The depicted computer 50 includes a housing 52, a display 10, input structures 14, and input/output ports 12. The input structures 14 (such as a keyboard and/or a touchpad) may be used to interact with the computer 50, such as to start, control, or operate a GUI or applications running on the computer 50. For example, a keyboard and/or touchpad may allow a user to navigate a user interface or application interface displayed on the display 10. In addition, the input and output ports 12 may allow connection of additional devices. For example, the computer 50 may include an I/O port 12, such as a USB port or other port, suitable for connecting to another electronic device, such as a handheld electronic device 30.

In addition, as discussed with respect to the handheld device 30, the computer 50 may include data processing circuitry (such as one or more processors), network connectivity, memory, and storage capabilities that allow the computer 50 to store and execute a GUI and other applications suitable for implementing the present techniques. For example, the computer 50 may be capable of storing and executing programming code encoding routines suitable for accessing confidential information or secured applications or network connections using non-alphanumeric and non-biometric inputs (e.g., gestures, sequences, and so forth). Further, to the extent that a computer 50 has network connectivity, such connectivity may be utilized to update or modify an existing application on the computer 50 to provide such functionality.

Figure 4:
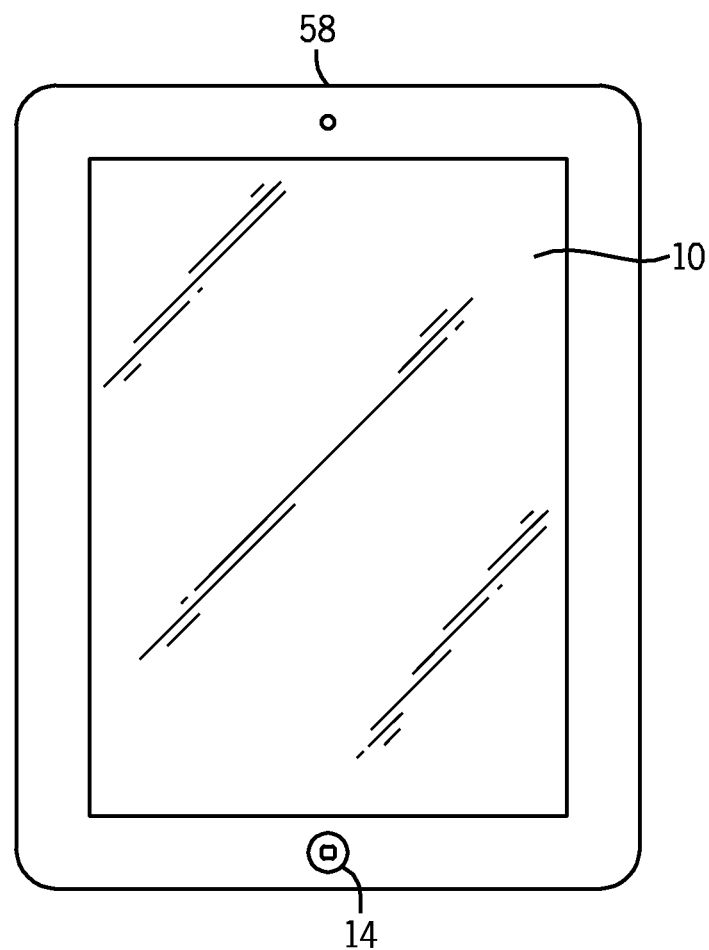
FIG. 4 is a perspective view of a tablet computer for use in accordance with aspects of the present disclosure.

In addition to the handheld device 30 of FIG. 2 and the computer 50 of FIG. 3, the electronic device 10 may take other forms, such as a portable multi-function tablet computing device 58, as depicted in FIG. 4. In certain embodiments, the tablet computing device 58 may provide the functionality of more than one type of electronic device, such as a device incorporating the functionality of two or more of a media player, a web browser, a cellular phone, a gaming platform, a personal data organizer, and so forth. For example, in the depicted embodiment, the tablet computing device 58 may provide various additional functionalities, such as the ability to display information, take pictures and record audio and/or video listen to music, play games, and so forth. By way of example only, the tablet computing device 58 may be a model of an iPad tablet computer, available from Apple Inc.

Figure 5:
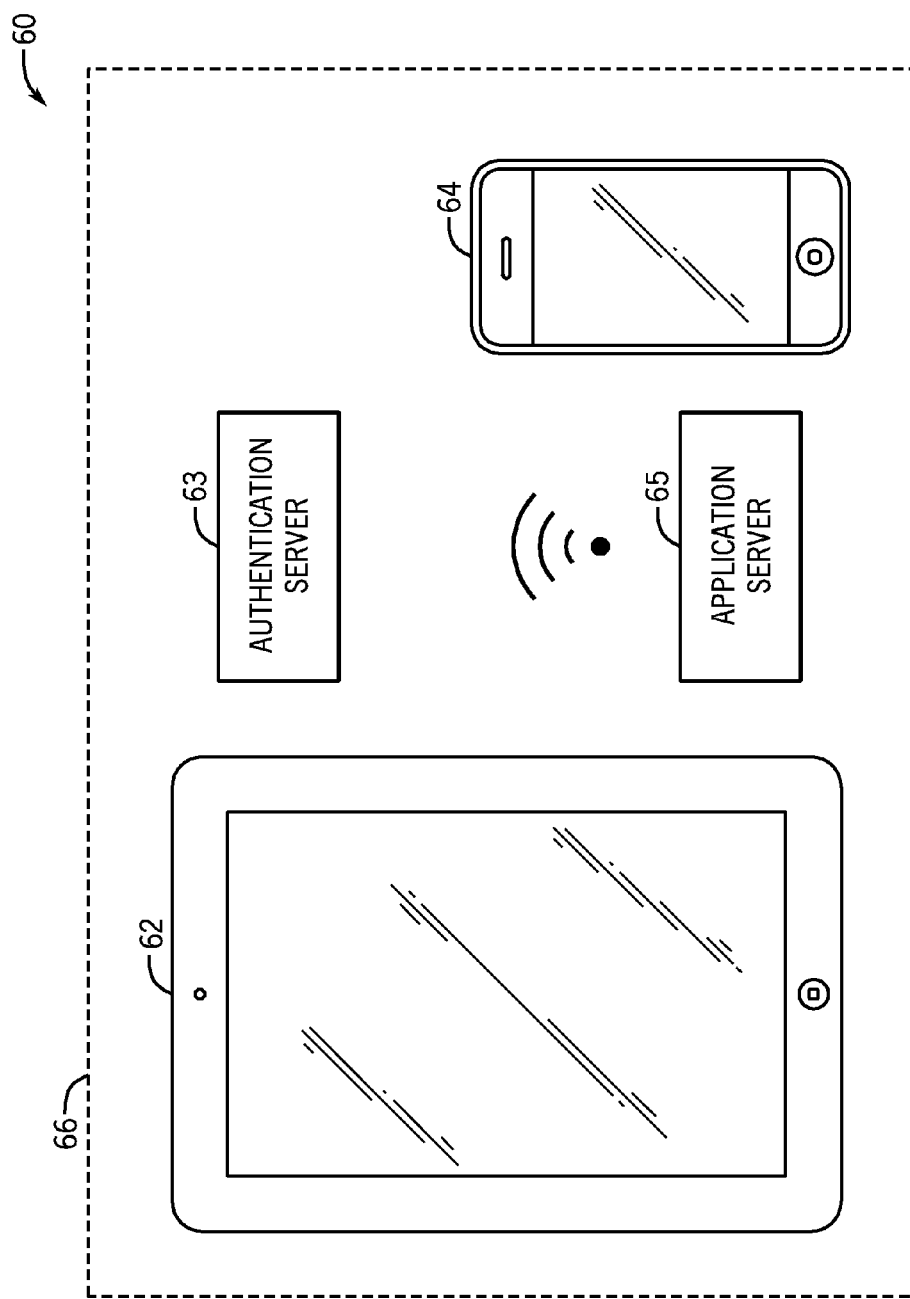
FIG. 5 is a view of an indirect authorization system in accordance with aspects of the present disclosure.

With the foregoing discussion in mind, it may be appreciated that electronic device 8 may be suitable for the indirect authorization techniques presented in this disclosure. FIG. 5 shows an indirect authorization system 60. While FIG. 5 illustrates a tablet computer as a first display device 62 and a cellular telephone as a second authorizing device 64, it should be noted that the display device 62 and the authorizing device 64 can each be one of any suitable display devices. The indirect authorization system 60 also includes a wireless network 66 through which the display device 62 and the authorizing device 64 communicate. In some embodiments, an authorization server 63 and an application server 65 may also be suitable for wireless communication with each other and with the display device 62 and the authorizing device 64 via the wireless network 66.

While the display device 62 of the indirect authorization system 60 generally has many functions, including, but not limited to, any combination of functions of electronic device 8 mentioned above, the display device 62 may be configured so that only a subset of its functions or content is accessible at a given time. For example, the display device 62 may be configured to run in a display mode, where unrestricted content is available, but restricted content is accessible only after authorization is received. In one or more embodiments, the display device 62 may be configured to operate in display mode to display only limited screens of certain images or text, and when operating in display mode, the display device 62 may be configured to respond to only certain user inputs. For example, in a retail setting, a display device 62 may be configured to display information about a certain product, such as name, price, images, and other product specifications. In some embodiments, a display device 62 in display mode may be limited to playing a particular video or presentation.

In some embodiments, the display device 62 may also be configured to operate in an authorized mode. As discussed, the display device 62 may include restricted content or functions in addition to the unrestricted content which generally can only be accessed while the display device 62 is in authorized mode. In some embodiments, restricted content may include a range of capabilities including, for example, internet browsing, text messaging, connecting to a secure network. The restricted content may also include confidential information or secure functions such as looking up inventory, performing a transaction, and so forth. When the display device 62 is granted authorization to operate in authorized mode, the display device 62 may access certain restricted functions or content. In some embodiments, authorized mode may authorize the display device 62 to access any available functions or content. Furthermore, in some embodiments, the display device 62 may not include additional interface elements for accessing the restricted content.

In some embodiments, an authorizing device 64 may be configured to grant authorization by receiving an authorization request signal from the first device 62 and prompting a user of the authorizing device 64 for authentication to grant authorization to the display device 62 such that the display device 62 may operate in an authorized mode.

The wireless network 66 may be a personal area network (PAN) such as a Bluetooth™ network, a local area network (LAN) such as an 802.11 Wi-Fi network, a wide area network (WAN) such as a 3G or 4G cellular network, and other suitable wireless networks. The authentication server 63 in the wireless network 66 may include account data and/or identity data associated with accounts associated with the indirect authorization system 60. For example, account information for each employee of the system 60 may be stored in the authentication server 63. In some embodiments, the authentication server 63 may include processing or control elements suitable for verifying a user's account or verifying a user's authentication input, referred to as authenticating a user. For example, the authentication server 63 may compare a user authentication input (e.g., an identifying password, gesture, account name, etc.) with account data stored in an account database in the authentication server 63.

In some embodiments, the indirect authorization system 60 may also include an application server 65 connected in the wireless network 66. The application server 65 may be configured to proxy between one or more devices of the system 60, such as between one or more display devices 62 and one or more authorizing devices 64. The application server 65 may be suitable for transmitting various signals (e.g., authorization request signal, authentication input, and/or authorizing signal, etc.) between different devices of the system 60. In some embodiments, the application server 65 may also verify an authority level of an authenticated user for performing a function, accessing content, authorizing access to content or functions, and/or monitoring access to content. In some embodiments, processing components or data associated with authentication and authorization may be stored in the authorizing device 64.

Figure 6:
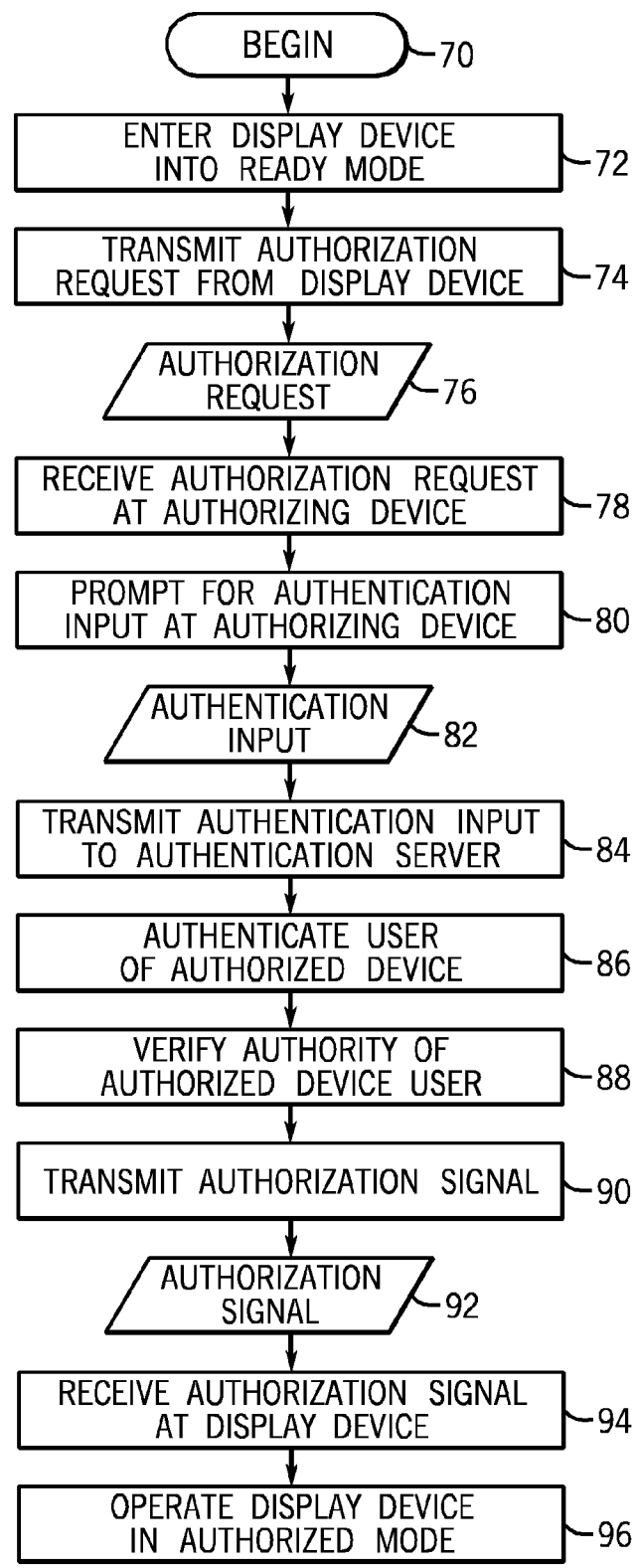
FIG. 6 is a flowchart depicting a process of indirect authorization in accordance with aspects of the present disclosure.
Figure 7:
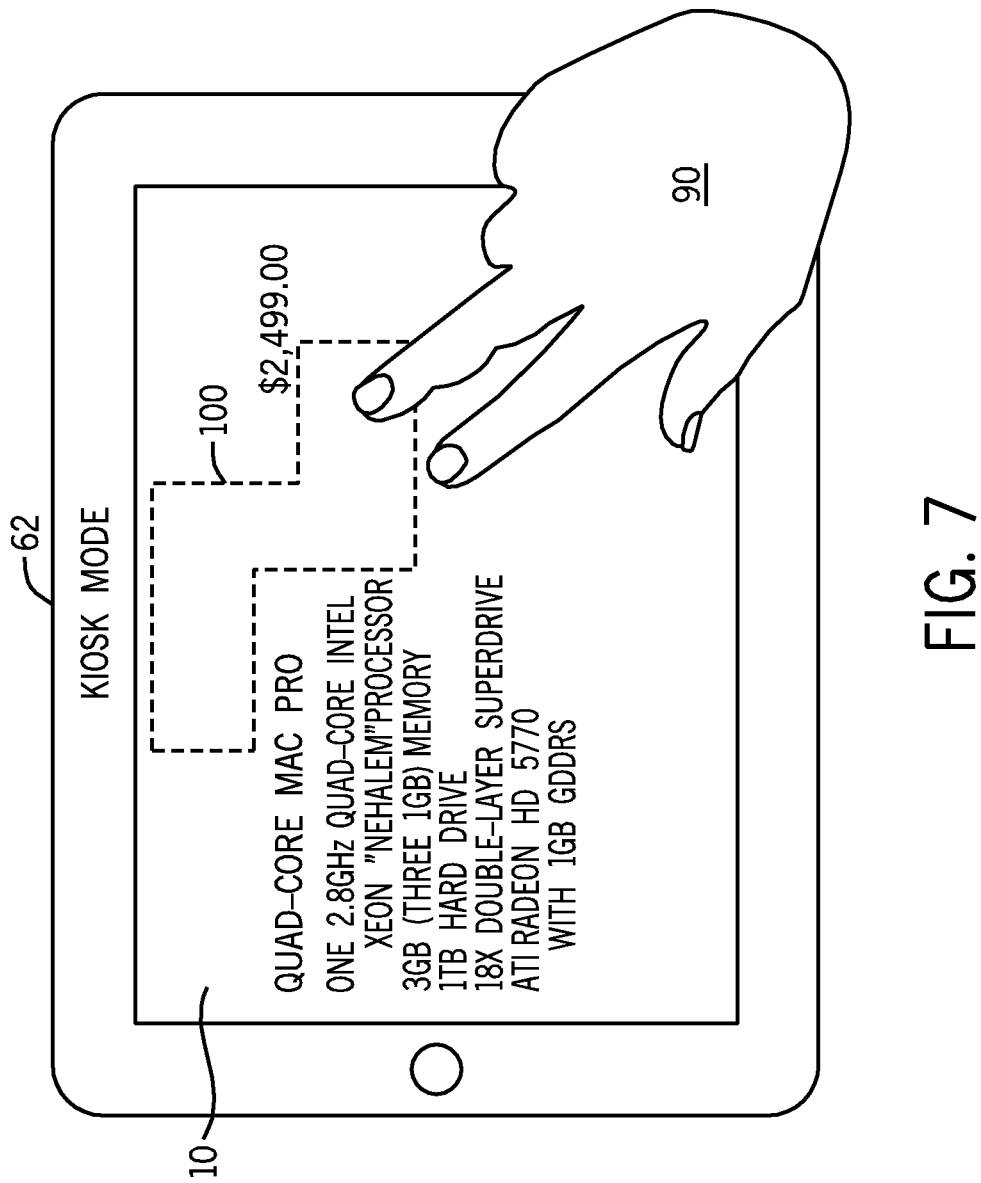
FIG. 7 is a representative view of a first device being entered into a ready mode, in accordance with aspects of the present disclosure.
Figure 8:
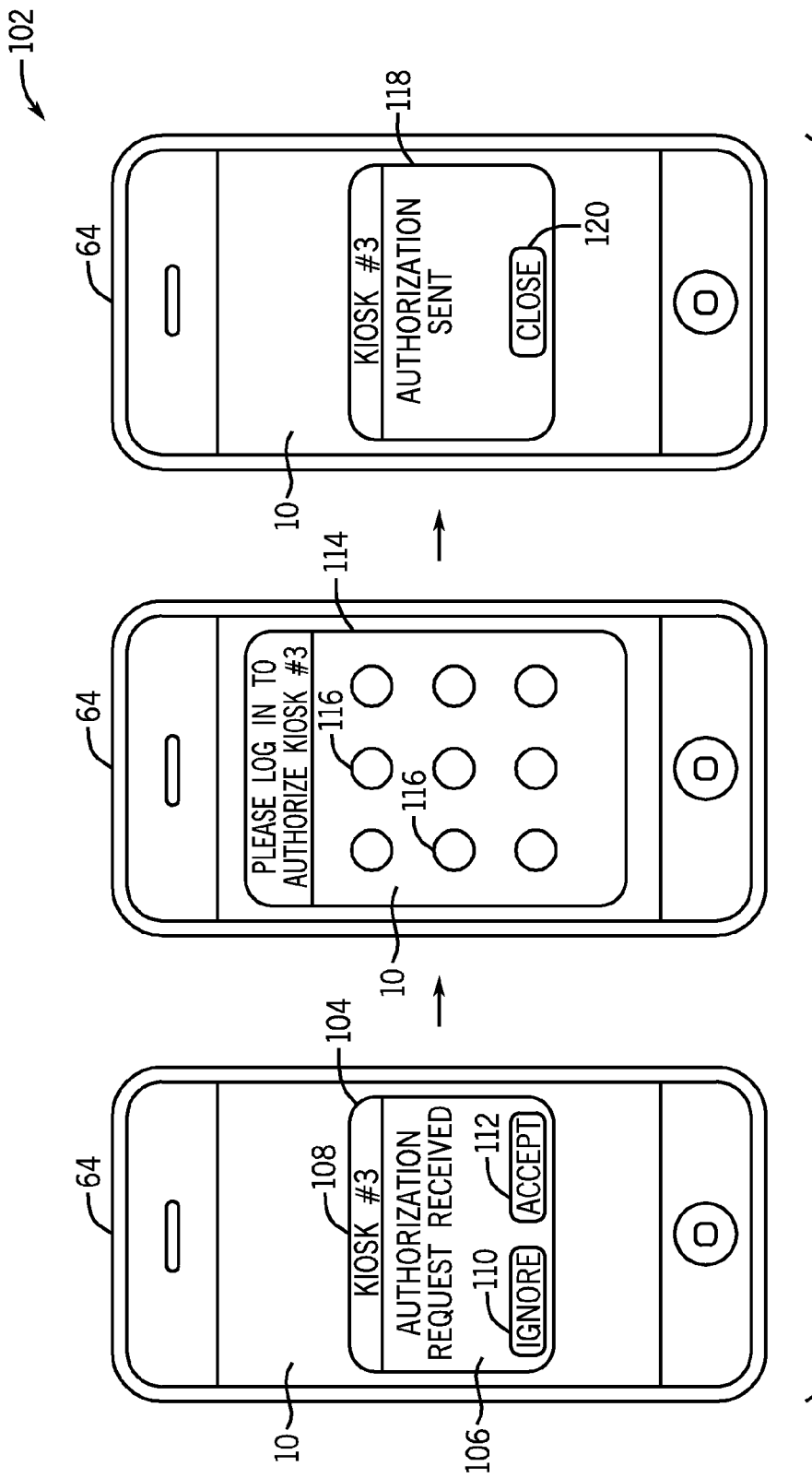
FIG. 8 is an illustration of a progression of screens on a second device in an indirect authorization process, in accordance with aspects of the present disclosure.
Figure 9:
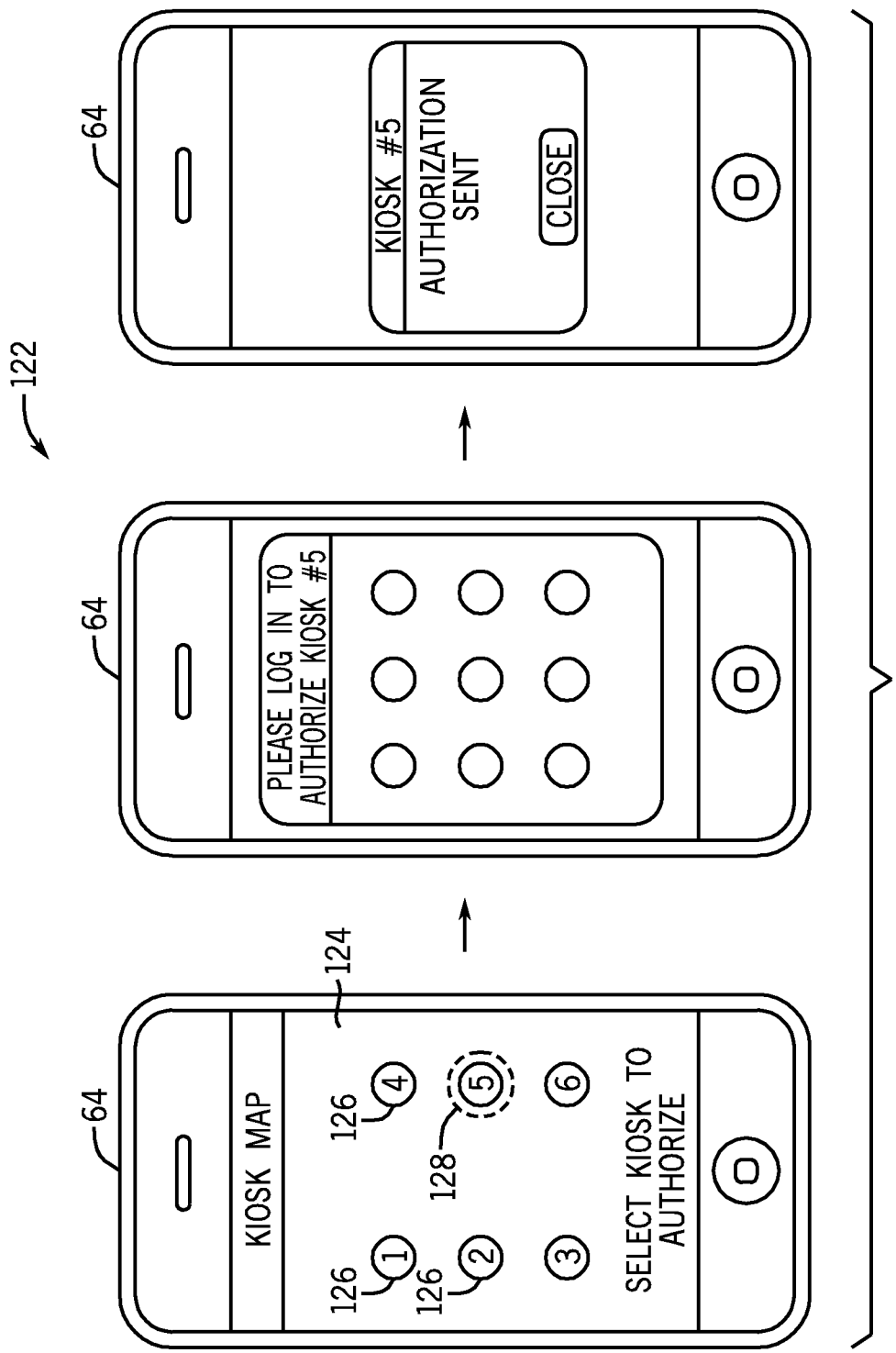
FIG. 9 is an illustration of a progression of screens on a second device in another indirect authorization process, in accordance with the present disclosure.

FIG. 6 is a flowchart of an indirect authorization process 68, and FIGS. 7-9 illustrate screens on the display device or the authorizing device during the indirect authorization process 68. As such, FIGS. 6-9 will be discussed concurrently. In some embodiments, the indirect authorization process 68 may begin (block 70) with the display device 62 operating in display mode. The process 68 may then involve entering (block 72) the display device 62 in ready mode. Ready mode may refer to an operational state of the display device 62 where the display device 62 indicates to an authorizing device 64 that the display device 62 is requesting authorization to operate in authorized mode and/or ready to receive authorization to operate in authorized mode. In some embodiments, a display device 62 operating in ready mode may have similar functions as a device 62 operating in display mode. Entering (block 72) the display device 62 in ready mode may generally be performed by a user having knowledge of how to enter the display device 62 in ready mode. For example, while an unauthorized user (e.g., a customers) may not have knowledge of what inputs or actions may change the display device 62 from display mode to ready mode, an authorized user (e.g., an employee) may enter the display device 62 to ready mode in a process of authorizing the display device 62 for access to restricted content.

FIG. 7 is an illustration of one embodiment of entering (block 72) a display device 62 in ready mode. As illustrated in FIG. 7, the display device 62 may be configured to display unrestricted content (e.g., produce specifications) while in a display mode. The display device 62 may be entered (block 72) into ready mode in response to receiving a gesture-based user input on the display. In the illustrated embodiment, the display device 62 is a touch-screen enabled device, and may be configured to detect a user's contact with the touch-screen display 10. The display device 62 may have a ready-mode gesture 100 stored in memory. The ready-mode gesture 100 may be a pattern or path of a user's contact (e.g., via a user's finger) over the surface of the display 10 on the display device 62. When the display device 62 detects that the appropriate ready-mode gesture 100 has been input in the display 10, the display device 62 may enter ready mode. For example, in some embodiments, the ready-mode gesture 100 may be known by users authorized to enter the display device 62 in ready mode and/or authorized to operate the display device 62 in authorized mode. Furthermore, some embodiments may include different means of entering (block 72) the display device 62 in ready mode, such as activating other user interface elements (e.g., an icon, a button, a switch, etc.), holding the display device 62 a certain way, or inputting a code. In some embodiments, the display device 62 may transmit (block 74) an authorization request 76 once the display device 62 is in ready mode.

The authorization request 76 may be received (block 78) by a second device, referred to as the authorizing device 64, over a wireless network 66. In response to receiving (block 78) the authorization request 76, the authorizing device 64 may prompt (block 80) a user for authentication. FIG. 8 is an illustration of a progression 102 of screens of the authorizing device 64 depicting a user interface of the authorizing device 64 in response to receiving (block 78) an authorization request 76 in the indirect authorization process 68. In response to receiving (block 78) an authorization request 76, the authorizing device 64 may be configured to display an authorization request notification 104. In the present embodiment, the authorization request notification 104 may appear on the display 10 on top of the current content of the display when the authorization request is received and may indicate to a user of the authorizing device 64 that a display device 62 has requested authorization to operate in authorized mode. In the present embodiment, the authorization request notification 104 displays a message 106 viewable by the user and an identification reference 108 of the display device 62. In some embodiments, the notification 104 may also include an ignore button 110 and an accept button 112. Activation of the ignore button 110 may dismiss the authorization request notification 104 from the display 10, and activating the accept button 112 may continue the indirect authorization process 68 on the authorizing device 64, and the authorizing device 64 may prompt (block 80) a user of the device 64 for authentication. As used herein, "activating" a button may be done by a number of actions, such as pressing, pushing, selecting, touching, and so forth, depending on the interface type.

The authorizing device 64 may prompt (block 80) a user for authentication by displaying a user interface for receiving user inputs representing a user account. For example, in some embodiments, the authorizing device 64 may display an arrangement of gesture nodes 114 having multiple gesture nodes 116, and the user may input an authentication input 82 by contacting (e.g., touching, swiping, tracing, etc.) the arrangement of gesture nodes 114 in a path or pattern, referred to as a gesture input. In some embodiments, the authorizing device 64 may display account and/or password data fields, and a user may input an authentication input 82 by entering information such as an account name and/or password, referred to as a password input. In some embodiments, the gesture input and the password input are embodiments of the authentication input 82, which generally corresponds to a user account in the system 60 (FIG. 5).

In some embodiments, the authentication input 82 (e.g., a gesture input, password input, etc.) may be transmitted (block 84) by the authorizing device 64 to an authentication server 63 (FIG. 5) connected to the wireless network 66. In some embodiments, the authentication server 63 may include control or processing elements suitable for comparing the authentication input 82 with a database or collection of user accounts. Based on the authentication input 82, the authentication server 63 may authenticate (block 86) the user of the authorized device 64. More specifically, the authentication server 63 may determine whether the authentication input 82 is associated with an account in the system 60. In some embodiments, the authentication server 63 may communicate with an application server 65 which may verify (block 88) the authority of an authenticated user to determine whether the user entering the authentication input 82 has the authority to grant authorization for the display device 62 to operate in authorized mode. It should be noted that in some embodiments, authentication and/or authorization may occur on the authorizing device 64.

In some embodiments, once a user of the authorizing device 64 has been authenticated (block 86) and once the user's authority has been verified (block 88), an authorization signal 92 may be transmitted (block 90) to the display device 62. In some embodiments, the authorization signal 92 may be transmitted by either the application server 65, the authentication server 63, or the authorizing device 64. The authorizing device 64 may also display an indication 118 that the display device 62 is authorized to operate in authorized mode. The indication 118 may also include a close button 120 for dismissing the indication 118 and returning the authorizing device 64 to its original state previous to entering the indirect authorization process 68.

Once the display device 62 receives (block 94) the authorization signal 92. The display device 62 may process the signal and begin operating (block 96) in an authorized mode. In authorized mode, the display device 62 may generally access to additional content and functions previously restricted when the display device 62 operated in a display mode or ready mode. In some embodiments, operation in authorized mode involves authorization to access only certain functions or content in the display device 62. For example, an authorizing device 64 may select categories of functions or content which may be authorized for access on the display device 62 during its operation in authorized mode. Alternatively, the display device 62 may indicate the particular functions or content for which access is requested in the authorization request 76. In some embodiments, the authorization signal 92 may grant authorization for a limited period of time (e.g., 5 minutes, 10 minutes, etc.) or for a limited amount of data (e.g., 50 MB), and in some embodiments, the authorized mode may involve a removal or restrictions and full access to any content or functions of the display device 62.

FIG. 9 is an illustration of another progression 122 of screens which may be displayed by the authorizing device 64 in an indirect authorization process 68 As illustrated in FIG. 9, one embodiment includes displaying a map view 124 of a group of display devices 62 represented as nodes 126. The map view 124 may show the display devices 62 based on their location relative to each other as well as the authorizing device 64. The map view 124 may be configured to show details regarding the display devices 62 such as type of device, usage, and so forth. The may view 124 may also indicate if one or more of the display devices 62 has been put in ready mode and requires authorization. In the embodiment illustrated in FIG. 9, the map view 124 may display an indication 128 that a particular display device 62 (e.g., device 5 in the illustration) has transmitted an authorization request signal. Such an indication 128 may include, for example a flashing node, a different color node, or other form of differentiation. To proceed with indirect authorization a display device 62, a user may select a display device 62. For example, in some embodiments, the indicated device may be selected. Selecting a display device 62 may result in the authentication and authorization process previously discussed with respect to FIGS. 5 and 8.

Figure 10:
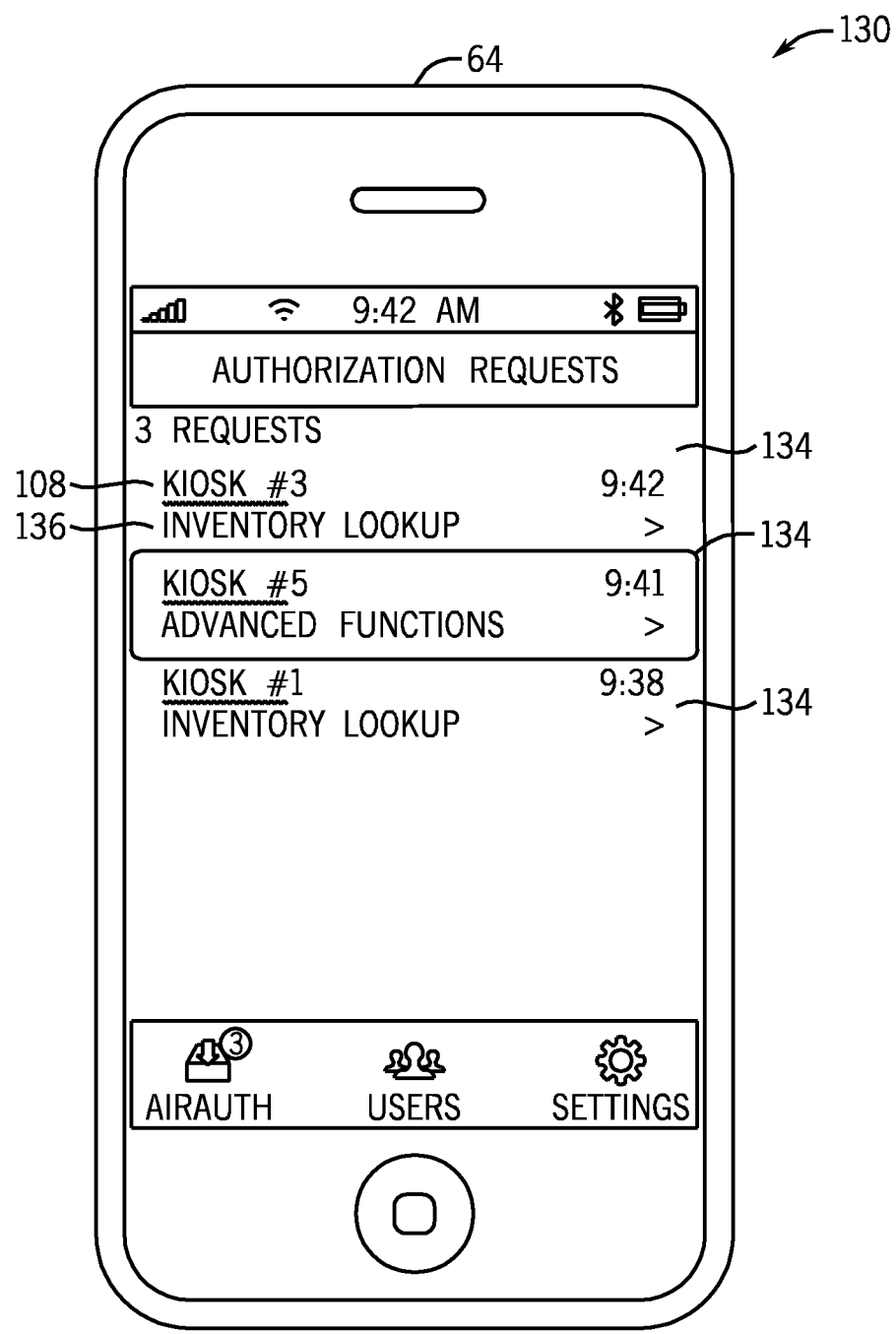
FIG. 10 is a screen of a second device having an authorization request queue, in accordance with the present disclosure.

In one or more embodiments, an authorizing device 64 may be configured to receive authorization requests 76 from more than one display device 62. In such embodiments, the authorizing device 64 may be configured to display an authorization request queue screen 130, as shown in FIG. 10. The authorization request queue screen 130 may include a total 132 of pending authorization requests 134 and list each pending authorization requests 134. In the present embodiment, each pending authorization request 134 includes an identification number 108 of the requesting device, a requested content 136, and a time of request 138. The authorizing device 64 is configured to allow the user to select any pending authorization request 134 for authorizing.

Figure 11:
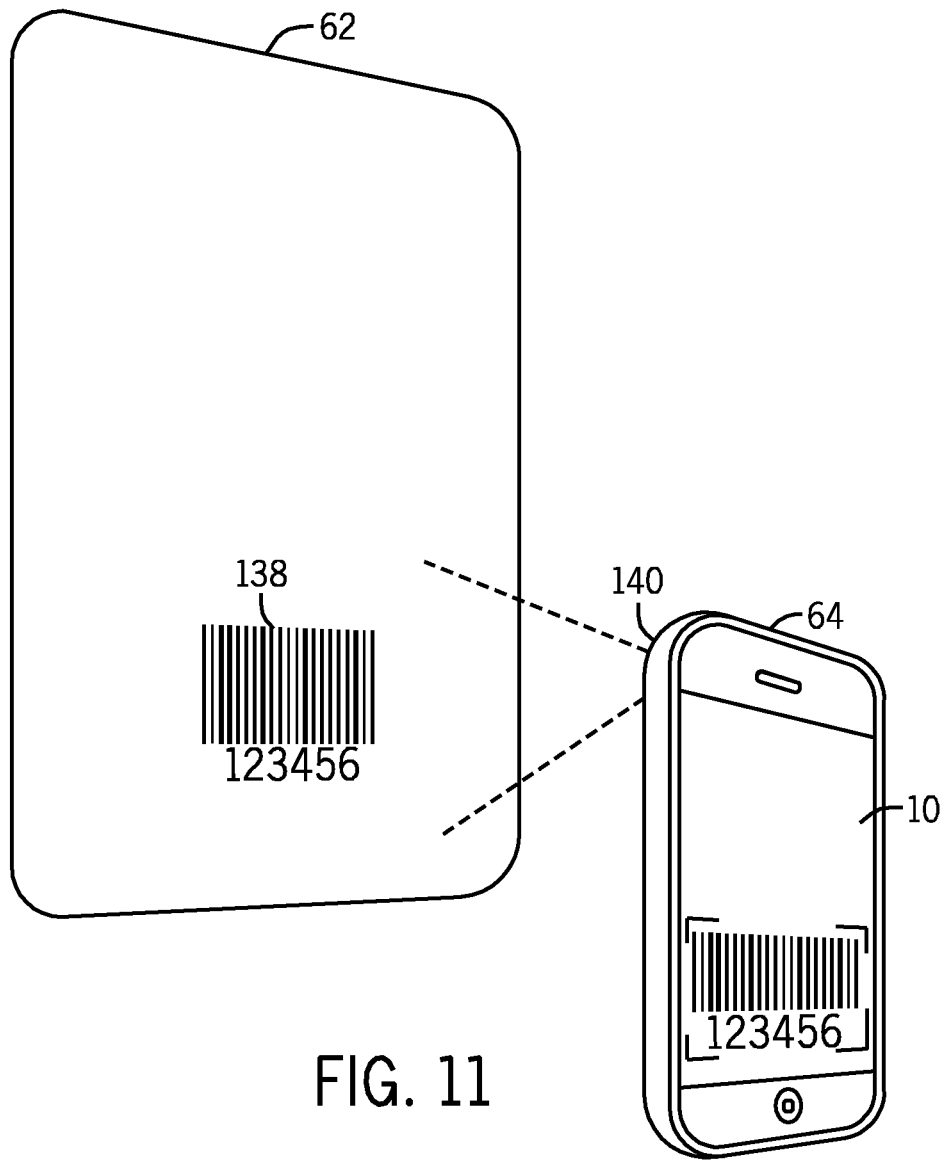
FIG. 11 is a representation of an indirect authorization system using a camera on an authorizing device, in accordance with the present disclosure.

While in some embodiments, the indirect authorization techniques involves transmitting a wireless request signal from a display device 62 to an authorizing device 64, in other embodiments, the authorizing device 64 may not necessarily receive a request signal before proceeding to authorize a display device 62. For example, FIG. 11 illustrates an embodiment of indirect authorization techniques where a display device 62 may not necessarily transmit an authorization request to an authorizing device 64. As illustrated in FIG. 11, a display device 62 may include a visual identifier or code, such as a barcode 138, disposed on the exterior of the device 62 or on any portion of the device 62 that is visibly accessible. For example, the barcode 138 may be disposed on the back of the device 62. If a user of an authorizing device 64 wishes to operate the display device 62 in authorized mode, the authorizing user may scan the barcode 138 of the display device 62 to authorize the display device 62 associated with the particular scanned barcode 138. In some embodiments, the authorizing device 64 may include an optical sensor 140, such as a camera, and may be configured to capture an image of the barcode 138. The authorizing device 64 may then match the image of the barcode 138 with a database of barcodes to identify the display device 62 on which the barcode 138 is disposed. If the barcode 138 is recognized, the authorizing device 64 may transmit an authorization signal to the display device 62 on which the barcode 138 is disposed.

In some embodiments, the database of barcodes may be stored on a suitable server (e.g., authentication server 63 or application server 65 in the system 60) or in the authorizing device 64. Furthermore, in some embodiments, upon identification of a barcode 138, the authorizing device 64 may request authentication and/or authorization of a user of the authorizing device 64 (as discussed with respect to FIGS. 5 and 8) before proceeding to authorize the display device 62.

Figure 12:
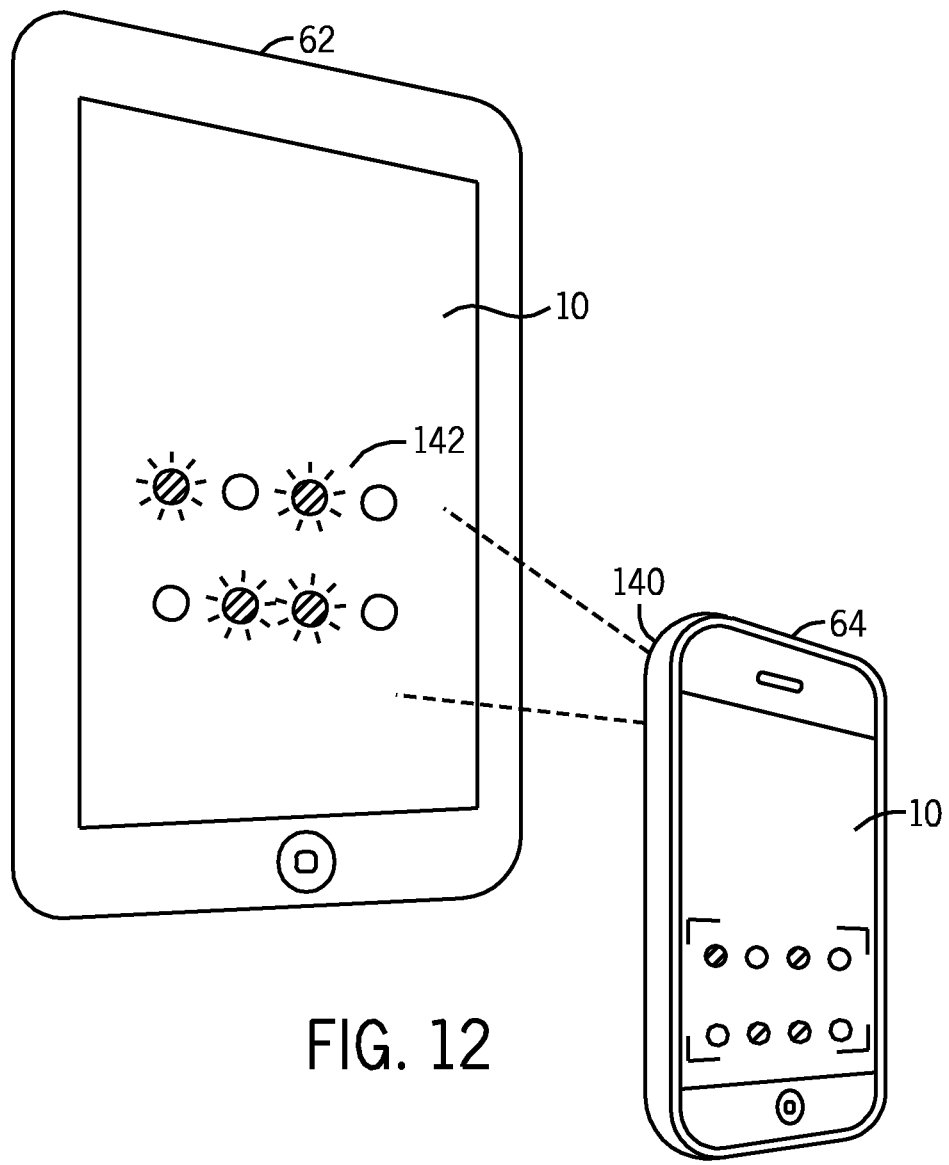
FIG. 12 is a representation of another indirect authorization system using a camera on an authorizing device, in accordance with the present disclosure.

Furthermore, in some embodiments, the display device 62 may display or emit or transmit an indication that the particular display device 62 is in ready mode. For example, the ready-mode indication may include an audio signal detectable by the authorizing device 64 and/or a visual signal displayed by the display device 62 and detectable by the authorizing device 64. For instance, as illustrated in FIG. 12, in response to being entered in ready mode, the display device 62 may display a sequence of flashing nodes 142 on its display 10. The sequence of flashing nodes 142 may represent a code identifying the display device 62 and/or indicating that the particular display device 62 is operating in ready mode. In this embodiment, the authorizing device 64 may scan or capture the sequence of flashing nodes 142 with its optical sensor 140. The authorizing device 64 may recognize the code represented by the sequence of flashing nodes and match it with the identity of the display device 62 to proceed with authorizing the display device 62. In some embodiments, the indirect authorization process may continue with authenticating and/or authorizing a user of the authorizing device 64 to authorize the display device 62.

While in some embodiments, the indirect authorization techniques may be initiated by the display device 62 entering a ready mode and/or transmitting a wireless request signal to an authorizing device, in some embodiments, indirect authorization may be initiated by the authorizing device 64. For example, a user of the authorizing device 64 may select (e.g., from a list or a map 128 of display devices 62) a display device 62 to authorize. When a particular display device 62 is selected, the indirect authorization techniques may involve authenticating and/or authorizing a user of the authorizing device 64 to continue with authorizing the selected display device 62.

Furthermore, in one or more embodiments, the indirect authorization process may involve authorizing a display device 62 without requesting additional authentication and/or authorization for each received authorization request on an authorizing device 64. For example, an authorizing device 64 may transmit an authorization signal to the display device 62. Such embodiments may assume that a user of the authorizing device 64 is authenticated and authorized. For example, authorizing a display device 62 without additional authentication and/or authorization may be based on proximity (e.g., if the display device 62 and the authorizing device 64 are within 2 feet apart). In some embodiments, the authorization signal transmitted by the authorizing device 64 may pass through a server (e.g., an application server 65) to verify the authorization of the display device 62.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system, comprising:
    a display device configured to operate in at least a display mode, a ready mode, and an authorized mode, wherein the display device is further configured to receive an authorization signal and operate in the authorized mode in response to receiving the authorization signal, wherein the authorization signal is received by the display device in response to a successful authentication of an authentication input provided on an authorizing device, the authorizing device and the display device being separate devices, wherein the display device in the ready mode indicates to the authorizing device that the display device is requesting authorization to operate in the authorized mode, wherein the ready mode is available after the display device is in the display mode and prior to operating the display device in the authorized mode, wherein operation in the authorized mode permits access to certain functions or content in the display device, and wherein the authorization signal permits operation in the authorized mode for a limited period of time or for a limited amount of data; and
    processing circuitry external to the display device, wherein the processing circuitry is configured to transmit the authorization signal to the display device if the authentication input of the authorizing device is authenticated and if the display device is authorized.

2. The system of claim 1, wherein at least one of the display device or the authorizing device is a touch screen device.

3. The system of claim 1, wherein the display device is configured to receive and process the authorization signal while operating in the ready mode.

4. The system of claim 1, wherein the display device is configured to operate in the ready mode upon receiving a ready-mode input.

5. The system of claim 4, wherein the display device is configured to transmit an authorization request signal upon receiving the ready-mode input.

6. The system of claim 1, wherein the authorizing device is configured to receive an authorization request signal from the display device and configured to prompt for the authentication input on the authorizing device in response to receiving the authorization request signal.

7. The system of claim 1, wherein the authorizing device is configured to produce an indication in response to receiving an authorization request from the display device, wherein the indication comprises an audio indication, a visual indication, or a combination thereof.

8. The system of claim 1, wherein the authorizing device is configured to receive the authentication input for verifying an identity of a user of the authorizing device.

9. The system of claim 8, comprising an authentication server configured to communicate with the authorizing device, wherein the authorizing device is configured to transmit the authentication input to the authentication server, and wherein the authentication server is configured to verify the identity of the user of the authorizing device based on the authentication input.

10. The system of claim 9, comprising an application server comprising the processing circuitry is configured to transmit the authorization signal to the display device, wherein the application server is configured to receive authentication data from the authentication server and transmit the authorizing signal based on the authentication data.

11. The system of claim 10, wherein the authorizing device comprises the processing circuitry external to the display device.

12. The system of claim 1, wherein the display device is configured to transmit an authorization request signal to the authorizing device, and wherein the authorizing device is configured to receive the authorization request signal from the display device and request the authentication input from a user of the authorizing device in response to receiving the authorization request signal.

13. An indirect authorization system, comprising:
    a display device comprising restricted content and unrestricted content, wherein the display device is configured to operate in at least a display mode, a ready mode, and an authorized mode, wherein in the display mode only the unrestricted content is accessible, the display device further configured to transmit a request signal before entering the authorized mode, receive an authorization signal, and operate in the authorized mode in response to receiving the authorization signal, wherein the authorized mode includes access to at least a portion of the restricted content, wherein the request signal is transmitted to an authorizing device configured to receive the request signal from the display device, and wherein the authorization signal is received by the display device in response to a successful authentication of an authentication input provided on the authorizing device, the authorizing device and the display device being separate devices, wherein the display device in the ready mode indicates to the authorizing device that the display device is requesting authorization to operate in the authorized mode, wherein the ready mode is available after the device is in the display mode and prior to operating the display device in the authorized mode, wherein operation in the authorized mode permits access to certain functions or content in the display device, and wherein the authorization signal permits operation in the authorized mode for a limited period of time or for a limited amount of data;
    a server configured to receive the authentication input from the authorizing device, authenticate the authentication input, and transmit the authorization signal to the display device; and
    a network configured to support communication between the display device, the authorizing device, and the server.

14. The indirect authorization system of claim 13, wherein the display device is configured to transmit the request signal to a plurality of authorizing devices.

15. The indirect authorization system of claim 13, wherein the authorizing device is configured to queue received request signals from a plurality of display devices.

16. The indirect authorization system of claim 13, wherein the display device is configured to select one of a plurality of authorizing devices for transmitting the request signal.

17. The indirect authorization system of claim 13, wherein the request signal is one of an optical signal and an audio signal.

18. The indirect authorization system of claim 17, wherein the authorizing device comprises a camera configured to detect the optical signal.

19. A method of operating a display device in a display mode such that unrestricted content is accessible on the display device while restricted content is not accessible on the display device unless an authorization signal is received by the display device, the method comprising:
   transmitting, by the display device, a request signal to an authorizing device, the authorizing device and the display device being separate devices;
   receiving, by the display device, the authorization signal, wherein the authorization signal permits the display device to operate in an authorized mode to access at least part of the restricted content, wherein the authorization signal is received by the display device in response to a successful authentication of an authentication input provided on the authorizing device, wherein operation in the authorized mode permits access to certain functions or content in the display device, and wherein the authorization signal permits operation in the authorized mode for a limited period of time or for a limited amount of data; and
   operating the display device in the authorized mode after the display device receives the authorization signal, wherein the display device is configured to operate in at least a display mode, a ready mode, and the authorized mode, and wherein the display device in the ready mode indicates to the authorizing device that the display device is requesting authorization to operate in the authorized mode, wherein the ready mode is available after the device is in the display mode and prior to operating the display device in the authorized mode.

20. The method of claim 19, comprising operating the display device in the ready mode in response to receiving a ready-mode input on the display device.

21. The method of claim 20, comprising transmitting an authorization request signal from the display device to the authorizing device when the display device is operating in the ready mode.

22. The method of claim 19, comprising authenticating the authentication input by comparing the authentication input to an account database in an authentication server.

23. A non-transitory computer readable medium comprising instructions, which when executed by a processing system of a display device, performs a method of operating the display device in a display mode such that unrestricted content is accessible on the display device while restricted content is not accessible on the display device unless an authorization signal is received by the display device, the method comprising:
   transmitting, by the display device, a request signal to an authorizing device, the authorizing device and the display device being separate devices;
   receiving, by the display device, the authorization signal, wherein the authorization signal permits the display device to operate in an authorized mode to access at least part of the restricted content, wherein the authorization signal is received by the display device in response to a successful authentication of an authentication input provided on the authorizing device, wherein operation in the authorized mode permits access to certain functions or content in the display device, and wherein the authorization signal permits operation in the authorized mode for a limited period of time or for a limited amount of data; and
   operating the display device in the authorized mode after the display device receives the authorization signal, wherein the display device is configured to operate in at least a display mode, a ready mode, and the authorized mode, and wherein the display device in the ready mode indicates to the authorizing device that the display device is requesting authorization to operate in the authorized mode, wherein the ready mode is available after the device is in the display mode and prior to operating the display device in the authorized mode.

24. The non-transitory computer readable medium of claim 23, comprising:
   operating the display device in the ready mode in response to receiving a ready-mode input on the display device.

25. The non-transitory computer readable medium of claim 24, comprising:
   transmitting an authorization request signal from the display device to the authorizing device when the display device is operating in the ready mode.

26. The non-transitory computer readable medium of claim 23, comprising:
   authenticating the authentication input by comparing the authentication input to an account database in an authentication server.

* * * * *